(12) United States Patent
Kim et al.

(10) Patent No.: US 11,488,782 B2
(45) Date of Patent: Nov. 1, 2022

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Dongjin Kim, Suwon-si (KR); Changhak Choi, Suwon-si (KR); Bonseok Koo, Suwon-si (KR); Changsu Jang, Suwon-si (KR); Moonseong Jeong, Suwon-si (KR); Eunyong Jang, Suwon-si (KR); Byung Kun Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 25 days.

(21) Appl. No.: 16/896,468

(22) Filed: Jun. 9, 2020

(65) Prior Publication Data
US 2021/0027948 A1 Jan. 28, 2021

(30) Foreign Application Priority Data
Jul. 25, 2019 (KR) .................. 10-2019-0090182

(51) Int. Cl.
*H01G 4/30* (2006.01)
*H01G 4/248* (2006.01)
(Continued)

(52) U.S. Cl.
CPC .............. *H01G 4/30* (2013.01); *H01G 4/008* (2013.01); *H01G 4/012* (2013.01); *H01G 4/232* (2013.01); *H01G 4/248* (2013.01)

(58) Field of Classification Search
CPC ........ H01G 4/30; H01G 4/012; H01G 4/1227; H01G 4/2325; H01G 4/008; H01G 4/0085;
(Continued)

(56) References Cited

U.S. PATENT DOCUMENTS

| 6,043,973 | A | 3/2000 | Nagashima et al. |
| 8,102,639 | B2 | 1/2012 | Kasuya et al. |

(Continued)

FOREIGN PATENT DOCUMENTS

| CN | 101354962 B | 3/2011 |
| CN | 104178652 A | 12/2014 |

(Continued)

OTHER PUBLICATIONS

Chinese Office Action dated Jul. 5, 2022, issued in corresponding Chinese Patent Application No. 202010708682.7.

*Primary Examiner* — Michael P McFadden
(74) *Attorney, Agent, or Firm* — Morgan, Lewis & Bockius LLP

(57) ABSTRACT

A multilayer ceramic electronic component includes a ceramic body, including dielectric layers and internal electrodes, and external electrodes disposed on external surfaces of the ceramic body and electrically connected to the internal electrodes. Each of the internal electrodes includes a nickel-cobalt (Ni—Co) alloy, and a content of the cobalt (Co) is 0.01 at % to 10 at % based on 100 at % of the nickel (Ni).

8 Claims, 2 Drawing Sheets

(51) Int. Cl.
*H01G 4/232* (2006.01)
*H01G 4/012* (2006.01)
*H01G 4/008* (2006.01)

(58) Field of Classification Search
CPC .......... H01G 4/12; H01G 4/224; H01G 4/228; H01G 4/232; H01G 4/248
See application file for complete search history.

(56) References Cited

U.S. PATENT DOCUMENTS

| | | | | |
|---|---|---|---|---|
| 2004/0256603 | A1* | 12/2004 | Celik | C22C 1/0425 252/500 |
| 2009/0067117 | A1* | 3/2009 | Kasuya | H01G 4/30 156/89.18 |
| 2011/0195178 | A1* | 8/2011 | Kojima | C04B 35/4682 427/126.3 |
| 2013/0286539 | A1* | 10/2013 | Kim | H01G 13/006 264/615 |
| 2014/0048750 | A1* | 2/2014 | Kim | H01B 1/22 977/932 |
| 2014/0311783 | A1* | 10/2014 | Lee | H01G 4/005 361/321.2 |
| 2017/0129058 | A1 | 5/2017 | Yoshii | |
| 2017/0287636 | A1* | 10/2017 | Sakurai | C04B 35/49 |
| 2018/0182549 | A1* | 6/2018 | Koide | C04B 35/638 |
| 2019/0103222 | A1* | 4/2019 | Aman | C04B 35/499 |

FOREIGN PATENT DOCUMENTS

| | | |
|---|---|---|
| CN | 106104702 A | 11/2016 |
| JP | H11-021644 A | 1/1999 |
| JP | 2004-079994 A | 3/2004 |
| JP | 2015-138915 A | 7/2015 |
| KR | 10-0258676 B1 | 6/2000 |
| KR | 10-2004-0062566 A | 7/2004 |

* cited by examiner

I-I'

'B'

MULTILAYER CERAMIC ELECTRONIC COMPONENT AND METHOD OF MANUFACTURING THE SAME

CROSS-REFERENCE TO RELATED APPLICATION(S)

This application claims the benefit under 35 USC 119 (a) of Korean Patent Application No. 10-2019-0090182 filed on Jul. 25, 2019 in the Korean Intellectual Property Office, the entire disclosure of which is incorporated herein by reference for all purposes.

BACKGROUND

1. Field

The present disclosure relates to a multilayer ceramic electronic component and a method of manufacturing the same, and more particularly, to a multilayer ceramic electronic component having improved reliability and a method of manufacturing the same.

2. Description of Related Art

In general, electronic components using a ceramic material, such as a capacitor, an inductor, a piezoelectric element, a varistor, a thermistor, or the like, include a ceramic body formed of a ceramic material, internal electrodes disposed within the ceramic body, and external electrodes mounted on external surfaces of the ceramic body to be connected to the internal electrodes.

Among ceramic electronic components, a multilayer ceramic capacitor includes a plurality of laminated dielectric layers, internal electrodes disposed to face each other, with respective dielectric layers interposed therebetween, and external electrodes electrically connected to the internal electrodes.

Multilayer ceramic capacitors have been widely used as components in mobile communications devices such as computers, personal digital assistants (PDAs), mobile phones, and the like, due to advantages thereof such as a small size, high capacitance, ease of mounting, and the like.

In accordance with the recent trend for electronic devices having high performance as well as lightness, slimness, shortness, and smallness, there has been demand for electronic components having a small size, high performance, and ultrahigh capacitance.

In particular, a multilayer ceramic capacitor is used as a general-purpose electronic component, and applications and use amounts thereof are continuously increasing. To develop ultrahigh-capacitance products, thinning of dielectric layers and internal electrodes is underway.

With the thinning of dielectric layers and internal electrodes, short-circuit failure, DC bias degradation, and poor reliability tend to be increasing.

As an internal electrode is decreased in thickness, short-circuit failure may frequently occur due to various reasons. One of the reasons is an increase in deformation caused by strength reduced during high-temperature sintering.

In order to address the short-circuit failure of a multilayer ceramic capacitor, a method of increasing the strength thereof by alloying heterogeneous elements to a nickel electrode has been studied.

There may be various metals alloyed with nickel to increase the strength of an electrode. However, such metals are limited by reducibility, based on characteristics of internal electrodes.

For example, since internal electrodes of a multilayer ceramic capacitor are sintered at a high temperature, it is difficult to use a material liable to be oxidized at high temperature.

When an electrode is oxidized during sintering, electro-conductivity may be lowered and deformation may occur due to volumetric expansion of the electrode. Thus, an occurrence rate of short-circuits may be increased.

Accordingly, it is necessary to add a material, similar to nickel in reducibility and oxidability, capable of increasing strength of nickel when added.

SUMMARY

An aspect of the present disclosure is to provide a multilayer ceramic capacitor and a method of manufacturing the same, and more particularly, to a multilayer ceramic electronic component having improved reliability and a method of manufacturing the same.

According to an aspect of the present disclosure, a multilayer ceramic electronic component includes a ceramic body, including dielectric layers and internal electrodes, and external electrodes disposed on external surfaces of the ceramic body and electrically connected to the internal electrodes. Each of the internal electrodes includes a nickel-cobalt (Ni—Co) alloy, and a content of cobalt (Co) is 0.01 at % to 10 at % based on 100 at % of nickel (Ni).

According to another aspect of the present disclosure, a method of manufacturing a multilayer ceramic electronic component includes preparing a ceramic green sheet, forming an internal electrode pattern on the ceramic green sheet using a conductive paste for an internal electrode comprising nickel (Ni) and a cobalt oxide (CoO) in an amount of 0.01 at % to 10 at % based on 100 at % of the nickel (Ni), laminating ceramic green sheets, on which the internal electrode pattern is formed, to form a ceramic laminate, and sintering the ceramic laminate to form a ceramic body comprising a dielectric layer and an internal electrode comprising a nickel-cobalt (Ni—Co) alloy.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

An embodiment in the present disclosure relates to a ceramic electronic component. An electronic component, using a ceramic material, is a capacitor, an inductor, a piezoelectric element, a varistor, a thermistor, or the like. Hereinafter, a multilayer ceramic capacitor will be described as an example of a ceramic electronic component.

Figure 1:
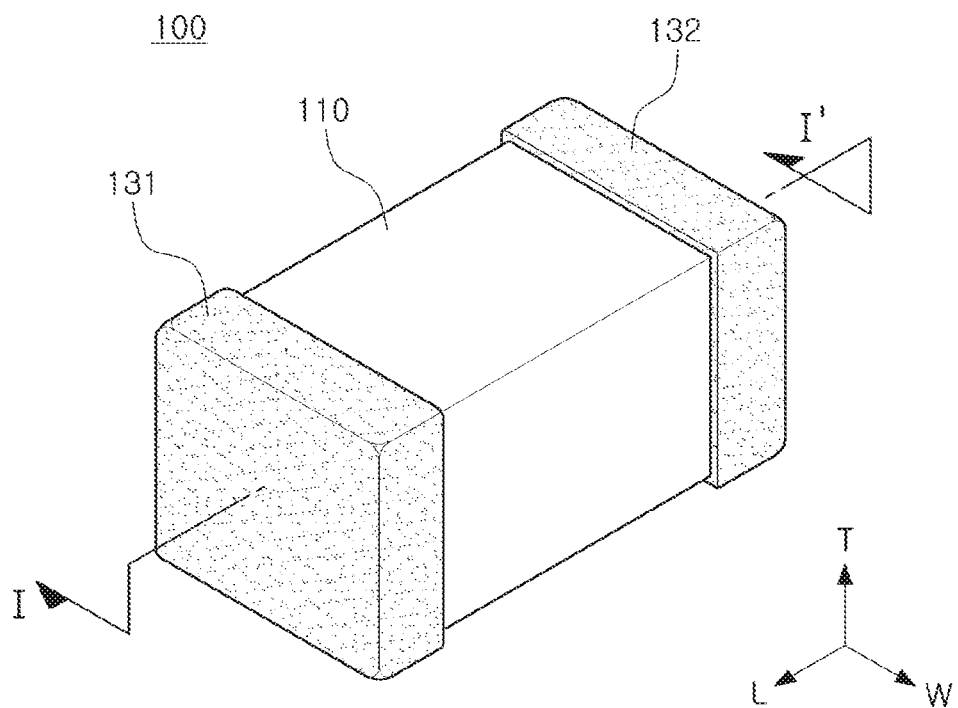
FIG. 1 is a perspective view of a multilayer ceramic capacitor according to an embodiment in the present disclosure.
Figure 2:
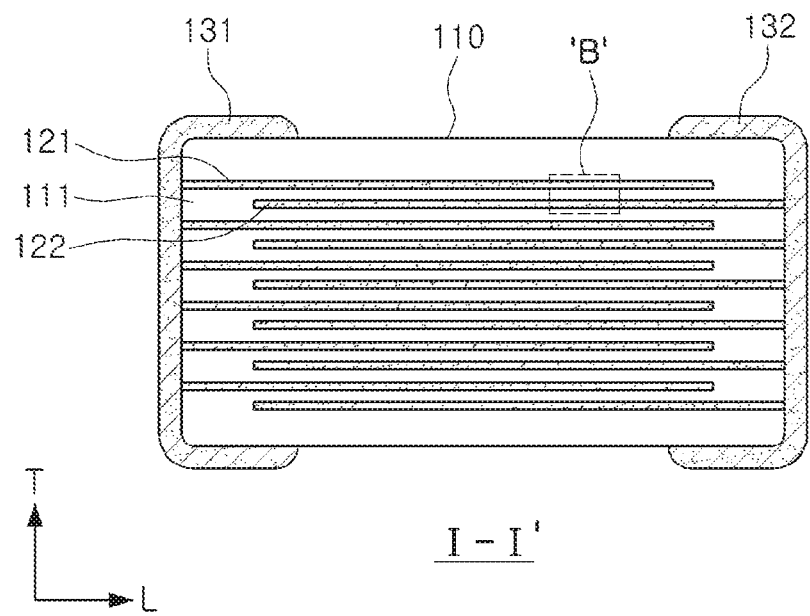
FIG. 2 is a cross-sectional view of the multilayer ceramic capacitor taken along line I-I of FIG. 1.
Figure 3:
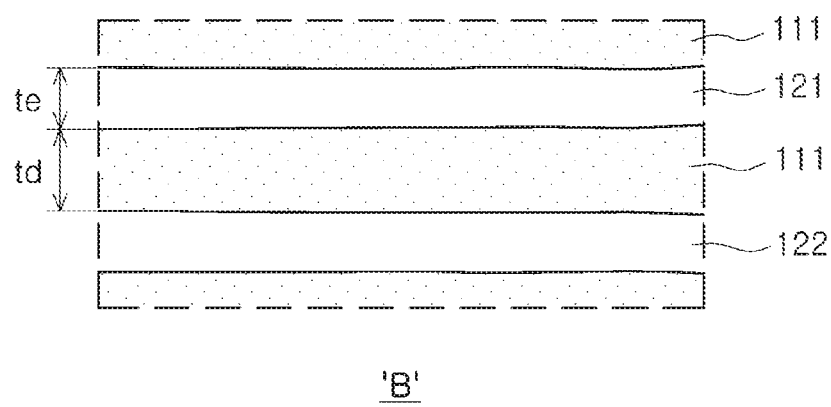
FIG. 3 is an enlarged view of region B of FIG. 2.

FIG. 1 is a perspective view of a multilayer ceramic capacitor according to an embodiment in the present disclosure;

FIG. 2 is a cross-sectional view of the multilayer ceramic capacitor taken along line I-I of FIG. 1; and FIG. 3 is an enlarged view of region B of FIG. 2.

Referring to FIGS. 1 to 3, a multilayer ceramic capacitor according to an embodiment may include a ceramic body 110, internal electrodes 121 and 122 disposed within the ceramic body 110, and external electrodes 131 and 132 disposed on external surfaces of the ceramic body 110.

In a multi-layered ceramic capacitor according to an embodiment in the present disclosure, a 'length direction' may be defined as an 'L' direction, a 'width direction' may be defined as a 'W' direction, and a 'thickness direction' may be defined as a 'T' direction. The 'thickness direction' may be used in the same sense as a direction in which dielectric layers are laminated, for example, as a 'lamination direction.'

A shape of the ceramic body 110 is not limited, but may be hexahedral according to an embodiment.

The ceramic body 110 may be formed by laminating a plurality of dielectric layers 111.

The plurality of dielectric layers 111, constituting the ceramic body 110, may be in a sintered state. Adjacent dielectric layers 111 may be integrated such that boundaries therebetween are not readily apparent.

The dielectric layer 111 may be formed by sintering a ceramic green sheet including ceramic powder particles.

The ceramic powder particles are not limited as long as they are commonly used in the art.

The dielectric layer 111 may include, for example, barium titanate ($BaTiO_3$)-based ceramic powder particles, but a material of the dielectric layer 111 is not limited thereto.

The $BaTiO_3$-based ceramic powder particles may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, and the like, prepared by partially employing calcium (Ca), zirconium (Zr), and the like, in $BaTiO_3$, but are not limited thereto.

The dielectric layers 111 may further include a transition metal, a rare earth element, magnesium (Mg), aluminum (Al), or the like, other than the ceramic powder particles.

A thickness of the dielectric layer 111 may vary depending on a capacitance design of the multilayer ceramic capacitor 100.

A thickness of the dielectric layer 111, disposed between two internal electrode layers adjacent to each other after sintering, may be a thickness of, for example, 1.0 μm or less, but is not limited thereto.

According to an embodiment, the thickness of the dielectric layer 111 may refer to an average thickness.

The average thickness of the dielectric layer 111 may be measured by scanning a cross section of the ceramic body 110 in the length direction in an image type using a scanning electron microscope (SEM), as illustrated in FIG. 2.

For example, a thickness of any dielectric layer, extracted from the image obtained by scanning a length and thickness direction (L-T) cross section cut at a central portion in a width direction W of the ceramic body 110 by the scanning electron microscope (SEM), may be measured at 30 points which are at equidistance in the length direction, such that an average value of the dielectric layer may be measured.

The 30 points at equidistance may be measured in a capacitance forming portion referring to a region in which first and second inner electrodes 121 and 122 overlap each other.

In addition, when the average value of the thickness of the dielectric layer is measured by extending to more than ten dielectric layers 111, the thickness of the dielectric layer 111 may be further generalized.

The internal electrodes 121 and 122 may be disposed within the ceramic body 110.

The internal electrodes 121 and 122 may be disposed and laminated on a ceramic green sheet, and may be formed within the ceramic body 110 with one dielectric layer interposed therebetween by sintering.

The internal electrode may include a pair of the first internal electrode 121 and the second internal electrode 122 having polarities opposite to each other, and may be disposed to face each other in a lamination direction of dielectric layers.

As illustrated in FIG. 2, ends of the first and second internal electrodes 121 and 122 may be alternately exposed to one surface of the ceramic body 110 in the length direction.

Although not illustrated in the drawings, according to an embodiment, first and second internal electrodes may have lead portions and may be exposed to the same surface of the ceramic body through the lead portions. Alternatively, the first and second internal electrodes may have lead portions and may be exposed to one or more surfaces of a ceramic body through the lead portions.

A thickness of each of the internal electrodes 121 and 122 is not limited but may be, for example, 1.0 μm or less.

According to an embodiment, 200 or more dielectric layers, on which internal electrodes are respectively disposed, may be laminated, which will be described in detail later.

According to an embodiment, when each of the internal electrodes 121 and 122 has a thickness of 1.0 μm or less, electrode strength may be lowered due to the internal electrodes 121 and 122. Accordingly, a characteristic configuration is proposed to prevent degradation in reliability such as a short-circuit failure or the like. When each of the internal electrodes 121 and 122 has a thickness greater than 1.0 μm, degradations in reliability may not occur even if the characteristic configuration is not applied.

For example, the characteristic configuration of the present disclosure to be described below may be applied to improve the reliability when each of the internal electrodes 121 and 122 has a thickness of 1.0 μm or less.

According to an embodiment, the external electrode 131 and 132 may be disposed on external surfaces of the ceramic body 110. The external electrodes 131 and 132 may be electrically connected and the internal electrodes 121 and 122.

More specifically, the external electrode 131 and 132 may include a first external electrode 131, electrically connected to a first internal electrode 121 exposed to one surface of the ceramic body 110, and a second external electrode 132 electrically connected to a second internal electrode 122 exposed to the other surface of the ceramic body 110.

Although not illustrated in the drawings, a plurality of external electrodes may be disposed to be electrically connected to the first and second internal electrodes 121 and 122 exposed to the ceramic body 110.

The external electrodes 131 and 132 may be formed of a conductive paste including metal powder particles.

The metal powder particles, included in the conductive paste, are not limited and may be, for example, Ni, Cu, or alloys thereof.

A thickness of each of the external electrodes 131 and 132 may be appropriately determined depending on applications thereof and may be, for example, about 10 to 50 μm.

According to an embodiment, the internal electrodes 121 and 122 include a nickel-cobalt (Ni—Co) alloy, and the cobalt (Co) is included in an amount of 0.01 at % to 10 at % based on 100 at % of nickel (Ni).

In general, to develop ultrahigh-capacitance products, thinning of dielectric layers and internal electrodes is underway. With the thinning of dielectric layers and internal electrodes, a short-circuit failure, DC bias degradation, and poor reliability tend to be increasing.

As an internal electrode is decreased in thickness, a short-circuit failure may frequently occur due to various reasons. One of the reasons is an increase in deformation caused by strength reduced during high-temperature sintering.

In order to address the short-circuit failure of a multilayer ceramic capacitor, a method of increasing the strength by alloying heterogeneous elements to a nickel electrode is proposed.

There are various metals alloyed to nickel to increase strength of an electrode. However, such metals are limited by reducibility based on characteristics of internal electrodes.

For example, since internal electrodes of a multilayer ceramic capacitor are sintered at a high temperature, it is difficult to use a material liable to be oxidized at a high temperature.

When an electrode is oxidized during sintering, electro-conductivity may be lowered and deformation may occur due to volume expansion of the electrode. Thus, an occurrence rate of short-circuit may be increased.

Accordingly, in an embodiment, cobalt (Co) has been studied as a material, similar to nickel in reducibility and oxidability, capable of increasing the strength of nickel when added thereto. Strength of an internal electrode could be improved using a nickel-cobalt (Ni—Co) alloy.

For example, according to an embodiment, the internal electrodes 121 and 122 include a nickel-cobalt (Ni—Co) alloy. A content of the cobalt (Co) may be adjusted to satisfy 0.01 at % to 10 at % based on 100 at % of the nickel (Ni). Thus, strength of an internal electrode may be increased to prevent a short-circuit failure or the like. As a result, a multilayer ceramic capacitor having improved reliability may be implemented.

The feature that "the internal electrodes 121 and 122 include a nickel-cobalt (Ni—Co) alloy" does not refer to "the Ni—Co alloy is included in a conductive paste for an internal electrode before sintering". The conductive paste for an internal electrode includes a cobalt oxide (CoO) together with pure nickel (Ni) powder particles. The Ni—Co alloy is formed by a reaction during sintering in a reduction atmosphere and is included in an internal electrode.

Accordingly, the internal electrodes 121 and 122 according to an embodiment include a nickel-cobalt (Ni—Co) alloy, which is different from a multilayer ceramic capacitor according to a related art in which an internal electrode is formed using a conductive paste for an internal electrode including Ni—Co alloy power particles.

In particular, when an internal electrode is formed using a conductive paste for an internal electrode including Ni—Co alloy powder particles as in the related art, the Ni—Co alloy powder particles should be additionally prepared. Therefore, process and cost issues may occur. In addition, when reduction conditions are insufficient during sintering of an internal electrode, cobalt oxide (CoO) may be formed to reduce capacitance of a multilayer ceramic capacitor.

However, according to an embodiment, an internal electrode is formed by performing sintering in a reduction atmosphere using a conductive paste for an internal electrode including cobalt oxide (CoO) powder particles together with pure nickel (Ni) powder particles. Therefore, all introduced cobalt oxides (CoO) may be reduced to cobalt (Co) and all of the reduced cobalt (Co) forms an alloy with nickel (Ni) and does not penetrate into a dielectric layer.

As a result, a reduction in capacitance does not occur even when the multilayer ceramic capacitor is manufactured using the conductive paste for an internal electrode including the cobalt oxide (CoO) powder particles.

According to an embodiment, the internal electrodes 121 and 122 may include a nickel-cobalt (Ni—Co) alloy, and a content of the cobalt (Co) may satisfy 0.01 at % to 10 at % based on 100 at % of the nickel (Ni).

The content of the cobalt (Co) may satisfy 0.01 at % to 10 at % based on 100 at % of the nickel (Ni) to improve a breakdown voltage (BDV) and reliability without changing the capacitance of the multilayer ceramic capacitor.

As can be seen from a result of an experiment related to the reliability, a measured value of mean time to failure (MTTF) may be increased when the content of the cobalt (Co) satisfies 0.01 at % to 10 at % based on 100 at % of the nickel (Ni).

When the content of the cobalt (Co) is less than 0.01 at % based on 100 at % of nickel (Ni), a breakdown voltage (BDV) and reliability improvement effect is insufficient.

When the content of the cobalt (Co) is greater than 10 at % based on 100 at % of the nickel (Ni), the capacitance of the multilayer ceramic capacitor may be lowered and reliability such as MTTF, or the like, may be degraded.

In detail, the content of the cobalt (Co) may be 0.1 at % to 1.0 at % based on 100 at % of the nickel (Ni).

The content of the cobalt (Co) may satisfy 0.1 at 1.0 to 1.0 at % based on 100 at % of nickel (Ni) to increase the capacitance of the multilayer ceramic capacitor and to enhance the breakdown voltage (BDV) and reliability improvement effect.

When the content of cobalt (Co) is less than 0.1 at % based on 100 at % of nickel (Ni), the breakdown voltage (BDV) and reliability improvement effect is insufficient.

When the content of the cobalt (Co) is greater 1.0 at % based on 100 at % of the nickel (Ni), the capacitance of the multilayer ceramic capacitor may be lowered and reliability such as MTTF, or the like, may be degraded.

Referring to FIG. 3, the multilayer ceramic capacitor according to an embodiment is an extremely small and high-capacitance product in which the dielectric layer 111 has a thickness td of 1.0 μm or less and each of the first and second internal electrodes 121 and 122 has a thickness to of 1.0 μm or less, but these thicknesses are not limited thereto.

For example, since the multilayer ceramic capacitor 100 according to an embodiment is an extremely small and high-capacitance product, the dielectric layer 111 and the first and second internal electrodes 121 and 122 have thicknesses lower than thicknesses of those of a product according to a related art. In the case of a product to which such a thin dielectric layer and internal electrodes are applied, reliability may be degraded due to deformation caused by a reduction in strength of the internal electrode, which is an important issue.

For example, a dielectric layer and an internal electrode of a multilayer ceramic capacitor according to a related art have relatively higher thicknesses than the dielectric layer and the internal electrode included in the multilayer ceramic capacitor according to an embodiment of the present invention. Therefore, the reliability degradation, occurring during sintering of the internal electrode, is not a significant issue.

However, in a product to which a thin dielectric layer and a thin internal electrode are applied as in an embodiment, control for improving strength of an internal electrode is required to prevent deformation of the internal electrode during the firing process such that high capacitance is secured and reliability is improved.

Accordingly, the strength of an internal electrode needs to be improved in a product in which the dielectric layer, having a thickness td of 1.0 μm or less, and the first and second internal electrodes 121 and 122, each having a thickness of 1.0 μm or less, after sintering are applied.

For example, in an embodiment, the internal electrodes 121 and 122 include a nickel-cobalt (Ni—Co) alloy, and a content of the cobalt (Co) satisfies 0.01 at % to 10 at % based on 100 at % of the nickel (Ni). Thus, reliability may be improved without lowering the capacitance even when each of the dielectric layer 111 and the internal electrodes 121 and 122 has a thickness of 1.0 μm or less.

In detail, the internal electrodes 121 and 122 include the nickel-cobalt (Ni—Co) alloy and the content of the cobalt (Co) satisfies 0.1 at % to 1.0 based on 100 at % of the nickel (Ni). Thus, a multilayer ceramic electronic component having improved reliability may be implemented while increasing capacitance.

However, the thickness of each of the dielectric layer 111 and the first and second internal electrodes 121 and 122 is not limited to 1.0 μm or less, and may be construed to include a dielectric layer and an internal electrode, each having a thickness lower than a thickness of that of a product according to a related art.

According to another embodiment, a method of manufacturing a multilayer ceramic electronic component may include preparing a ceramic green sheet, forming an internal electrode pattern on the ceramic green sheet using a conductive paste for an internal electrode including nickel (Ni) and a cobalt oxide (CoO) in an amount of 0.01 at % to 10 at % based on 100 at % of nickel (Ni), laminating ceramic green sheets, on which the internal electrode pattern is formed, to form a ceramic laminate, and sintering the ceramic laminate to form a ceramic body including a dielectric layer and an internal electrode including a nickel-cobalt (Ni—Co) alloy.

Hereinafter, a method of manufacturing a multilayer ceramic capacitor according to another embodiment will be described.

According to an embodiment, a plurality of ceramic green sheets may be provided. A slurry may be prepared by mixing ceramic powder particles, a binder, a solvent, and the like. The slurry may be applied by a doctor blade to manufacture the ceramic green sheet in the form of a sheet having a thickness of several μm. Then, the ceramic green sheet may be sintered to form one dielectric layer 111, as illustrated in FIG. 2.

An internal electrode pattern may be formed on the ceramic green sheet using a paste for an internal electrode including nickel (Ni) and a cobalt oxide (CoO) in an amount of 0.01 at % to 10 at % based on 100 at % of nickel (Ni). The internal electrode pattern may be formed by screen printing or gravure printing.

The conductive paste for the internal electrode includes nickel (Ni) and cobalt oxide (CoO) in an amount of 0.01 at % to 10 at % based on 100 at % of the nickel (Ni).

The conductive paste for an internal electrode may further include ceramic powder particles, a binder, a solvent, and the like, other than the conductive metal.

In detail, the content of cobalt oxide (CoO), included in the conductive paste for an internal electrode, may be 0.1 at % to 1.0 at % based on 100 at % of the nickel (Ni).

According to another embodiment, since the internal electrode is formed by performing sintering in a reducing atmosphere using a conductive paste for an internal electrode, including a cobalt oxide (CoO), together with pure nickel (Ni) powder particles. Therefore, the injected cobalt oxide (CoO) all form an alloy with nickel (Ni) and does not permeate the dielectric layer.

Accordingly, a reduction in capacitance does not occur even when the multilayer ceramic capacitor is manufactured using the conductive paste for an internal electrode including the cobalt oxide (CoO) powder particles.

Ceramic green sheets, on which the internal electrode pattern is formed, may be laminated and pressed from a lamination direction by applying a pressure. As a result, a ceramic laminate, in which internal electrode patterns are formed, may be manufactured.

The ceramic laminate may be cut in each region, corresponding to a single capacitor, to be a chip.

In this case, one end of the internal electrode pattern may be cut to be alternately exposed through a side surface.

The ceramic laminate, cut to be a chip, may be sintered to form a ceramic body.

The sintering process may be performed in a reducing atmosphere. In addition, the sintering process may be performed by adjusting a temperature rising rate, but is not limited thereto. The temperature rising rate may be 30° C./60 s to 50° C./60 s at 700° C. or less.

After the sintering process, the ceramic body may include an internal electrode including a dielectric layer and a nickel-cobalt (Ni—Co) alloy.

A content of cobalt (Co), included in the internal electrode including the nickel-cobalt (Ni—Co) alloy, may be 0.01 at % to 10 at % based on 100 at % of the nickel (Ni).

As described above, in the method of manufacturing a multilayer ceramic electronic component according to another embodiment, an internal electrode is formed by performing a sintering process in a reducing atmosphere using the paste for an internal electrode, including the cobalt oxide (CoO), together with the nickel (Ni) powder particles. Therefore, all introduced cobalt oxides (CoO) may form an alloy with nickel (Ni) and do not permeate the dielectric layer.

Accordingly, the conductive paste for an internal electrode includes nickel (Ni) and cobalt oxide (CoO) in an amount of 0.01 at % to 10 at % based on 100 at % of the nickel (Ni). After the sintering process, a content of the nickel (Ni), included in the internal electrode including the nickel-cobalt (Ni—Co) alloy, may be 0.01 to 10 at % based on 100 at % of the nickel (Ni).

In detail, the conductive paste for an internal electrode includes nickel (Ni) and a cobalt oxide (CoO) in an amount of 0.1 at % to 1.0 at % based on 100 at % of nickel (Ni).

After the sintering process, the content of cobalt (Co), included in the internal electrode including the nickel-cobalt (Ni—Co) alloy may be 0.1 at % to 1.0 at % based on 100 at % of the nickel (Ni).

In this case, a multilayer ceramic electronic component having improved reliability may be implemented while increasing capacitance.

An external electrode may be formed to cover the side surface of the ceramic body and to be electrically connected to the internal electrode exposed to the side surface of the ceramic body. Then, a plating layer such as nickel or tin may be formed on a surface of the external electrode.

Hereinafter, the present disclosure will be described in detail with reference to Examples and Comparative Examples.

Multilayer ceramic capacitors according to Examples and Comparative Examples were prepared by a method described below.

Barium titanate powder particles, ethanol, as an organic solvent, and polyvinyl butyral, as a binder, were mixed and then ball-milled to prepare a ceramic slurry. A ceramic green sheet was manufactured using the ceramic slurry.

A conductive paste for an internal electrode, including Nickel (Ni) and a cobalt oxide (CoO) of each amount based on 100 at % of the nickel (Ni), was printed on the ceramic green sheet to form an internal electrode. A green laminate, formed by laminating the internal electrodes, was isostatically processed at a temperature of 85° C. and at a pressure of 1,000 kgf/cm$^2$.

The pressed green laminate was cut to forma green chip. The green chip was subjected to a binder removal process to be maintained at a temperature of 230° C. for 60 hours in an air atmosphere, and was then sintered at a temperature of 1000° C. to manufacture a sintered chip. The sintering process was performed in a reducing atmosphere to prevent oxidation of the internal electrodes, and the reducing atmosphere was set to $10^{-11}$ to $10^{-10}$ atm lower than a Ni/NiO equilibrium oxygen partial pressure.

An external electrode was formed on outside of the sintered chip by using a paste for an external paste including copper powder particles and glass powder particles, and a nickel plating layer and a tin plating layer were formed on the external electrode through electroplating.

A multilayer ceramic capacitor having a 0603 standard size was manufactured according to the above-described method. The 0603 standard size may have a length of 0.6 μm±0.1 μm and a width of 0.3 μm±0.1 μm. Characteristics of the multilayer ceramic capacitor were evaluated as follows.

Table 1 lists a content of cobalt (Co), after sintering, measured using a conductive paste for an internal electrode including nickel (Ni) and a cobalt oxide (CoO) of each content based on 100 at % of the nickel (Ni) according to an embodiment. After Sample 1, Comparative Example adding no cobalt (Co), was set to 1.0 as a reference value with respect to capacitance of a multilayer ceramic capacitor, BDV, and MTTF, measured results ware compared with each other based on relative values of the capacitance.

A method of measuring the content of the cobalt (Co) may be performed by cut only an electrode portion with focused ion beam (FIB) and analyzing components of the electrode portion using secondary ion mass spectroscopy (SIMS), energy dispersive X-ray spectroscopy (EDX), transmission electron microscope (TEM), or the like.

In detail, when a small content, 0.01 at % or less, of the cobalt (Co), is measured, components may be measured using inductively coupled plasma (ICP) by collecting remaining internal portions after melting a ceramic portion of the multilayer ceramic capacitor with sodium hydroxide (NaOH).

TABLE 1

| | Content of Co (at %) | Relative Value of Capacitance | Relative Value of BDV | Relative Value of MTTF |
|---|---|---|---|---|
| 1* | 0 | 1.0 (base) | 1.0 (base) | 1.0 (base) |
| 2 | 0.01 | 1.03 | 1.0 | 1.1 |
| 3 | 0.1 | 1.02 | 1.05 | 1.3 |
| 4 | 1.0 | 1.01 | 1.12 | 1.7 |
| 5 | 10 | 0.97 | 1.25 | 1.2 |
| 6* | 20 | 0.82 | 1.37 | 0.3 |

*Comparative Example

Sample 1, Comparative Example, is a case in which cobalt is not added. As can be seen from Table 1, BDV and MTTF are low, as in the related art.

Sample 6, a Comparative Example, is a case in which a content of the cobalt (Co) is 20 at % out of 0.01 at % to 10 at %, a range of the present disclosure, based on 100 at % of the nickel (Ni). In Sample 6, capacitance of a multilayer ceramic capacitor may be lowered and reliability such as mean time to failure (MTTF) may be degraded.

Meanwhile, Samples 2 to 5, embodiments in the present disclosure, satisfy the range of the present disclosure. As can be seen from Table 1, a high-capacitance multilayer ceramic capacitor having improved reliability may be implemented in Samples 2 to 5.

In detail, in the case of Samples 3 and 4 in which a content of the cobalt (Co) is 0.1 at % to 1.0 at % based on 100 at % of nickel (Ni), it can be seen that a breakdown voltage (BVD) and a reliability improvement effective are improved while increasing the capacitance of the multilayer ceramic capacitor.

As described above, according to an embodiment, an internal electrode may include a nickel-cobalt (Ni—Co) alloy and a content of the cobalt (Co) may be adjusted to satisfy 0.01 at % to 10 at % based on 100 at % of the nickel (Ni). Thus, strength of the internal electrode may be improved to prevent a short-circuit failure, or the like. As a result, a multilayer ceramic capacitor having improved reliability may be implemented.

While example embodiments have been shown and described above, it will be apparent to those skilled in the art that modifications and variations could be made without departing from the scope of the present disclosure as defined by the appended claims.

What is claimed is:

1. A multilayer ceramic electronic component comprising:
a ceramic body comprising dielectric layers and internal electrodes; and
external electrodes disposed on external surfaces of the ceramic body and electrically connected to the internal electrodes,
wherein each of the internal electrodes comprises a nickel-cobalt (Ni—Co) alloy, a content of cobalt (Co) is 0.1 at % to less than 1.0 at % based on 100 at % of nickel (Ni), and the external electrodes include glass.

2. The multilayer ceramic electronic component of claim 1, wherein each of the internal electrodes has a thickness of 1.0 μm or less.

3. The multilayer ceramic electronic component of claim 1, wherein each of the dielectric layers has a thickness of 1.0 μm or less.

4. The multilayer ceramic electronic component of claim 1, wherein the internal electrodes exclude cobalt oxide (CoO).

5. The multilayer ceramic electronic component of claim 1, wherein the dielectric layers include barium titanate.

6. The multilayer ceramic electronic component of claim 5, wherein the external electrodes further include copper, nickel, and tin.

7. The multilayer ceramic electronic component of claim 6, wherein the multilayer ceramic electronic component has a length of 0.6 μm±0.1 μm and a width of 0.3 μm±0.1 μm.

8. The multilayer ceramic electronic component of claim 1, wherein the content of cobalt (Co) is 0.1 at % based on 100 at % of nickel (Ni).

\* \* \* \* \*